(12) United States Patent
Hahn et al.

(10) Patent No.: US 8,549,293 B2
(45) Date of Patent: Oct. 1, 2013

(54) METHOD OF ESTABLISHING FAST SECURITY ASSOCIATION FOR HANDOVER BETWEEN HETEROGENEOUS RADIO ACCESS NETWORKS

(75) Inventors: Gene Beck Hahn, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 12/668,312

(22) PCT Filed: Jul. 3, 2008

(86) PCT No.: PCT/KR2008/003937
§ 371 (c)(1),
(2), (4) Date: Feb. 4, 2010

(87) PCT Pub. No.: WO2009/008627
PCT Pub. Date: Jan. 15, 2009

(65) Prior Publication Data
US 2010/0180111 A1    Jul. 15, 2010

(30) Foreign Application Priority Data

Jul. 10, 2007  (KR) ................ 10-2007-0069294
Jun. 24, 2008  (KR) ................ 10-2008-0059741

(51) Int. Cl.
*H04L 29/06*    (2006.01)

(52) U.S. Cl.
USPC ............. 713/168; 726/2; 713/150; 455/552.1

(58) Field of Classification Search
USPC .................................................. 713/168, 150
See application file for complete search history.

(56) References Cited

U.S. PATENT DOCUMENTS

| | | | |
|---|---|---|---|
| 2007/0021119 A1 | 1/2007 | Lee et al. | |
| 2007/0072605 A1 | 3/2007 | Poczo | |
| 2007/0109119 A1 | 5/2007 | Zhang et al. | |
| 2007/0190973 A1* | 8/2007 | Goto et al. | 455/410 |
| 2008/0141031 A1* | 6/2008 | Oba et al. | 713/170 |
| 2008/0310366 A1* | 12/2008 | Oba et al. | 370/331 |
| 2010/0211786 A1* | 8/2010 | Lim et al. | 713/169 |

* cited by examiner

*Primary Examiner* — Kambiz Zand
*Assistant Examiner* — Imhotep Durham
(74) *Attorney, Agent, or Firm* — Birch, Stewart, Kolasch & Birch, LLP

(57) ABSTRACT

A method of establishing security association between heterogeneous networks is disclosed. The method comprises a first step of receiving information of heterogeneous networks near a mobile station; a second step of transmitting a request message requesting authentication related information transfer to a target heterogeneous network where the mobile station intends to perform handover, among the heterogeneous networks near the mobile station; and a third step of receiving authentication related information and key related information of the target heterogeneous network. At this time, the first step, the second step, and the third step are preferable performed before handover is performed between heterogeneous networks.

5 Claims, 6 Drawing Sheets

METHOD OF ESTABLISHING FAST SECURITY ASSOCIATION FOR HANDOVER BETWEEN HETEROGENEOUS RADIO ACCESS NETWORKS

TECHNICAL FIELD

The present invention relates to a method of establishing fast security association for handover between heterogeneous radio access networks in a broadband radio access system.

BACKGROUND ART

Hereinafter, a media independent handover (MIH) function will be described in brief.

The MIH function is a logical entity and assists a mobile station (MS) to determine handover. The MIH entity can be located in both a mobile station and a network, and allows information of establishment or status of an access network near the mobile station to be exchanged between the mobile station and the network. This information may occur in different protocol stacks of the mobile station or several network entities. For example, a media independent information service (MIIS) of the MIH entity provides a function that can access information of all kinds of networks. The function of the MIIS is performed in such a manner that report through technologies subject to media is received.

FIG. 1 is a diagram illustrating a protocol layer schematic view of a multi-mode mobile station, IEEE 802 based network, and 3GPP/3GPP2 network.

The multi-mode mobile station has interface per mode, which can be divided into a physical (PHY) layer and a medium access control (MAC) layer. The MIH entity is located below an upper layer including IP layer, and defines handover between IEEE 802 based interface and interface defined by 3GPP/3GPP2 as well as handover between IEEE 802 based interfaces. In other words, the MIH entity facilitates a handover procedure between heterogeneous networks by obtaining information of other networks from a second layer. Meanwhile, the MIH function may exchange MIH signaling using information of a third layer, such as user policy or configuration.

FIG. 2 is a flow chart illustrating an authentication procedure of a mobile station in IEEE 802.16 system according to the related art.

FIG. 2 relates to an authentication procedure currently in service, and illustrates a flow of a schematic message and a transmission type of information. However, messages, which include information transmitted to and received from the mobile station, a base station (MS), or an authentication server, may have various types.

Referring to FIG. 2, when the mobile station intends to enter the network, the mobile station acquires synchronization with the base station, performs ranging, and performs negotiation of initial performance with the base station through SBC-REQ/RSP messages (S201). In the step S201, the mobile station and the base station negotiate initial performance. At this time, an example of a message transmitted and received between the mobile station and the base station includes SBC-REQ/RSP message of Table 1.

TABLE 1

SBC-REQ/RSP{
 Mandatory parameter
  Physical Parameters Supported
  Bandwidth Allocation Support TABLE 1-continued Optional parameter
  Capabilities for construction and transmission of MAC PDUs
  PKM Flow Control
  Authorization Policy Support
  Maximum Number of Supported Security Association
  Security Negotiation Parameters
  HMAC-CMAC Tuple
 }

In Table 1, the SBC-REQ (Subscribe Station Basic Request) message is transmitted by the mobile station during initialization. The base station transmits the SBC-RSP (Subscribe Station Basic Response) message to the mobile station in response to the SBC-REQ message. The SBC-REQ/RSP messages are to negotiate basic capability between the mobile station and the base station.

Negotiation of basic capability is intended to report basic capability of the mobile station to the base station directly after ranging ends. In Table 1, the SBC-REQ/RSP messages include parameters that can optionally be included, in addition to necessarily required parameters. Among the parameters, those related to security association (SA) include an authorization policy support field and security negotiation parameters.

The authorization policy support field is one of fields included in the SBC-REQ/RSP messages, and specifies an authorization policy to be negotiated and synchronized between the mobile station and the base station. If the authorization policy support field is omitted, the mobile station and the base station should use IEEE 802.16 security having X.509 credential and RSA public key algorithm as an authorization policy. An example of the authorization policy support field is as illustrated in Table 2 below.

TABLE 2

| Type | Length | Value | Region |
|------|--------|-------|--------|
|      | 1      | Bit #0: IEEE 802.16 Privacy Supported Bits #1-7: Reserved, shall be set to zero | SBC-REQ, SBC-RSP |

The security negotiation parameter field that can be included in Table 1 specifies whether to support security capabilities to be negotiated before initial authorization or reauthorization is performed.

Table 3 illustrates an example of the security negotiation parameter field.

TABLE 3

| Type | Length | Note | Scope |
|------|--------|------|-------|
| 25 | variable | The Compound field contains the subattributes as defined in the table below | SBC-REQ, SBC-SRP |

| Type | Length | Value |
|------|--------|-------|
|  | 1 | Bit #0: RSA-Based Authorization at the Initial Network Entry<br>Bit #1: EAP-Based Authorization at Initial Network Entry<br>Bit #2: Authenticated EAP-based Authorization at the initial Network Entry<br>Bit #3: Reserved, set to 0<br>Bit #4: RSA-Based Authorization at Reentry<br>Bit #5: EAP-Based Authorization at Reentry<br>Bit #6: Authentiacted EAP-Based Authorization Reentry<br>Bit #7: reserved, shall be set to 0 |

TABLE 3-continued

| Subattribute | Note |
| --- | --- |
| PKM Version Support | Version of Privacy Sublayer Supported |
| Authorization Policy Support | Authorization Policy to Support |
| Message Authentication code Mode | Message Authentication Code to Support |
| PN Window size | Size Capability of the Receiver PN Window per SAID |

Meanwhile, PKM Version Support field of Table 3 specifies PKM version. Namely, both the mobile station and the base station should negotiate only one PKM version. Table 4 illustrates an example of the PKM version support field.

TABLE 4

| Type | Length | Value |
| --- | --- | --- |
| 25.1 | 1 | Bit #0: PKM Version 1<br>Bit #1: PKM Version 2<br>Bits #2-7: reserved value, set to 0 |

Referring to FIG. 2, the mobile station requests an authentication authorization accounting server (AAA server) to authenticate an extensible authentication protocol (EAP) through the base station. The AAA server performs authentication of a user through an EAP authentication method in response to the request of the mobile station (S202). An example of the EAP authentication method includes a method of using X.509 credential in case of EAP-TLS. Also, an example of the EAP authentication method includes a method of using a specific type credit credential such as a subscriber identity module (SIM) in case of EAP-SIM. However, an RSA authentication method, which uses an encryption algorithm based on a public key encryption, may be used in accordance with requirements of the system.

In the step S202, if authentication of the mobile station (or user) is successfully completed, the AAA server generates a master session key (MSK) through the EAP based authentication method. The AAA server transmits MSK to the base station (S203). The base station transmits the MSK received from the AAA server to the mobile station so as to share it with the mobile station (S204).

An authentication key (AK) can be generated in the mobile station and the base station using PMK (S205). Alternatively, the AK can be generated using MSK. The AK is used to generate a traffic encryption key (TEK) for communication between the mobile station and the base station.

The mobile station and the base station share TEK through 3-way handshaking (S206). The 3-way handshaking is performed through handshaking of three stages, such as SA-TEK challenge, SA-TEK request, and SA-TEK response. At this time, the TEK used to encode actual data is generated so that the mobile station and the base station share it.

The mobile station and the base station, which have generated the AK by performing the authentication procedure, share the TEK and then perform a network entry procedure (S207).

As described above, security association during handover between heterogeneous radio access networks is not disclosed in the mobile communication system according to the related art. For example, if the mobile station, which uses IEEE 802.16 network, performs handover for other radio access system, a method of establishing security association for the handover is not defined. Accordingly, the method of establishing security association for the handover is required.

Furthermore, handover between heterogeneous radio access networks of the multi-mode mobile station, which is defined in the IEEE 802.21 system according to the related art, defines that the mobile station should newly perform an authentication and encryption key acquisition procedure when performing second layer handover with a new network. However, in this case, it is expected that time delay will be caused when the user receives a service, and data loss may be caused. One of basic requirements of the IEEE 802.16m system is that the IEEE 802.16m system should access another radio access systems. Accordingly, when the mobile station performs handover for a heterogeneous radio access system not the IEEE 802.16 broadband radio access system, a method of establishing security association is required.

DETAILED DESCRIPTION OF THE INVENTION

Technical Problems

Accordingly, the present invention is directed to a method of establishing fast security association, which substantially obviates one or more problems due to limitations and disadvantages of the related art.

An object of the present invention is to provide a method of establishing fast security association, in which access between different radio access technologies is allowed and a user can receive a seamless service without great load to a system network.

Another object of the present invention is to provide a method of establishing fast security association, in which information as to whether authentication of a multi-mode mobile station has been successfully performed is exchanged between authentication servers used in respective radio access technologies, through a media independent handover (MIH) entity of the mobile station, so as to reduce load and delay, which may be caused as authentication is newly performed like the related art.

Other object of the present invention is to provide a method of establishing fast security association, in which security contexts to be used in a target network can fast be transferred to a mobile station when handover occurs between different inter-radio access technologies.

Technical Solutions

To achieve these objects and other advantages and in accordance with the purpose of the invention, as embodied and broadly described herein, a method of establishing security association between heterogeneous networks, the method comprises a first step of receiving information of heterogeneous networks near a mobile station; a second step of transmitting a request message requesting authentication related information transfer to a target heterogeneous network where the mobile station intends to perform handover, among the heterogeneous networks near the mobile station; and a third step of receiving authentication related information and key related information of the target heterogeneous network, wherein the first step, the second step, and the third step are performed before handover is performed between heterogeneous networks. Preferably, the first step, the second step, and the third step are performed by a media independent handover (MIH) entity of the mobile station.

Furthermore, the information of heterogeneous networks near the mobile station includes security parameters of a second layer, which include an encryption algorithm and an authentication method of the heterogeneous networks near the mobile station.

Furthermore, the authentication related information of the target heterogeneous network includes security contexts used in the target heterogeneous network. In this case, the security contexts and the key related information are preferably generated in a target network authentication server.

Furthermore, the information of the heterogeneous networks can be generated in an information server.

In another aspect of the present invention, a method of establishing security association between heterogeneous networks comprises a first step of receiving a request message from a mobile station, the request message requesting authentication related information transfer to heterogeneous networks near the mobile station; a second step of transmitting the request message to an authentication server of a target heterogeneous network, where the mobile station intends to enter, among the heterogeneous networks near the mobile station; and a third step of receiving authentication related information and key related information of the heterogeneous networks from the authentication server of the target heterogeneous network, wherein the first step, the second step, and the third step are previously performed in a serving authentication server during handover between heterogeneous networks.

Preferably, the first step, the second step, and the third step are performed by a media independent handover (MIH) entity of the serving authentication server.

In another aspect of the present invention, a method of establishing security association between heterogeneous networks comprises a first step of receiving a request message requesting authentication related information and key related information of a target heterogeneous network; a second step of generating the authentication related information and the key related information; and a third step of transmitting a message including the authentication related information and the key related information, wherein the first step, the second step, and the third step are previously performed before handover is performed between heterogeneous networks.

The method further includes requesting the authentication related information and the key related information from an MIH entity of a target network authentication server to an upper layer or a lower layer; and generating the authentication related information and the key related information in the upper layer or the lower layer. At this time, the authentication related information of the target heterogeneous network includes security contexts used in the target heterogeneous network.

In still another aspect of the present invention, a method of establishing security association between heterogeneous networks comprises a first step of receiving information of heterogeneous networks near a mobile station from an information server; a second step of transmitting a request message to an MIH entity of a serving authenticator, the request message requesting authentication related information transfer to a target heterogeneous network where the mobile station intends to perform handover; and a third step of receiving authentication related information and key related information of the target heterogeneous network from the MIH entity of the serving authenticator, wherein the first step, the second step, and the third step are previously performed in an MIH entity of the mobile station when handover is performed between heterogeneous networks.

In further still another aspect of the present invention, a method of establishing security association between heterogeneous networks comprises a first step of receiving a request message from an MIH entity of a mobile station, the request message requesting authentication related information used in a target heterogeneous network; a second step of transmitting a request message to an MIH entity of a target heterogeneous network authenticator, the request message requesting authentication related information transfer; and a third step of receiving a message from the MIH entity of the target heterogeneous network authenticator, the message including the authentication related information and key related information, wherein the first step, the second step, and the third step are previously performed in a serving authenticator when handover is performed between heterogeneous networks.

ADVANTAGEOUS EFFECTS

According to the present invention, the following advantages can be obtained.

First, when the mobile station performs handover for heterogeneous radio access networks, the mobile station can quickly perform handover between heterogeneous radio access networks by establishing fast security association using MIH entities of the mobile station, the base station, and authentication servers.

Second, when handover occurs between heterogeneous radio access technologies, security contexts used in the target network are previously transmitted to the mobile station before handover, whereby fast security association can be established.

Third, when handover is performed between heterogeneous radio access networks, authentication related information of the mobile station is previously exchanged between authentication servers used in each radio access technology, whereby a new authentication procedure is not required during handover, and load and transmission delay due to information transfer between communication networks can be reduced.

BEST MODE FOR CARRYING OUT THE INVENTION

In order to the aforementioned technical problems, the present invention provides a method of establishing fast security association, which less affects service quality currently in service when a multi-mode mobile station performs handover between heterogeneous radio access networks.

The following embodiments are achieved by combination of structural elements and features of the present invention in a predetermined type. Each of the structural elements or features may be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that can make the subject matter of the present invention obscure have been omitted, and procedures or steps apparent to those skilled in the art have been omitted.

The embodiments of the present invention have been described based on data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as user equipment (UE) and mobile subscriber station (MSS).

Furthermore, a transmitter means a node that transmits data or audio service while a receiver means a node that receives data or audio service. Accordingly, in an uplink, the mobile station can serve as the transmitter while the base station can serve as the receiver. Likewise, in a downlink, the mobile station can serve as the receiver while the base station can serve as the transmitter.

Hereinafter, structures, operations, and other features of the present invention will be understood readily by the preferred embodiments of the present invention, examples of which are illustrated in the accompanying drawings.

Figure 3:
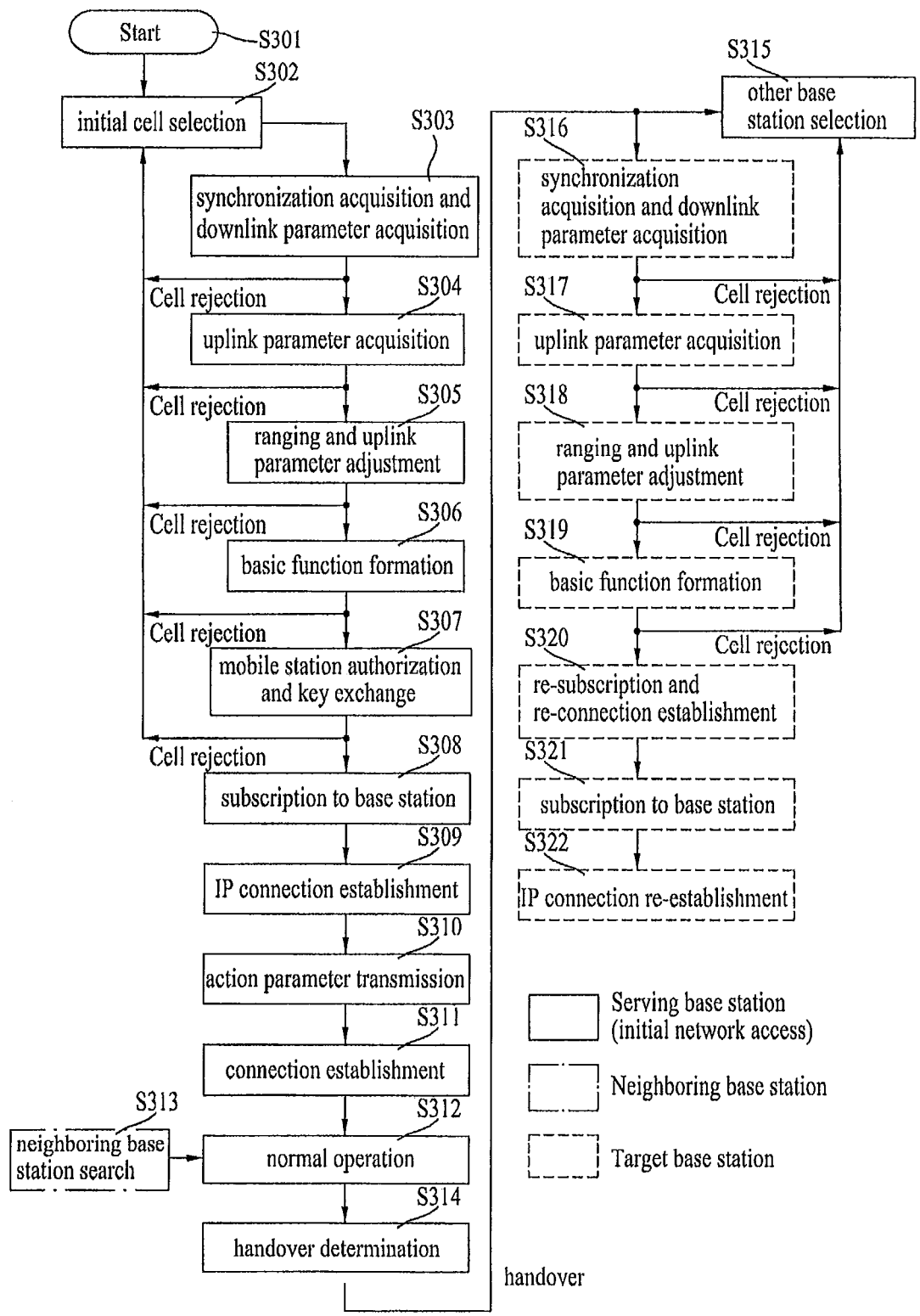
FIG. 3 is a flow chart illustrating handover and an initial network entry procedure.

FIG. 3 is a flow chart illustrating handover and an initial network entry procedure.

Referring to FIG. 3, the mobile station selects a cell during handover and initial network entry (S301, S302). Cell selection is to perform scanning or ranging with at least one base station to find a proper base station for network connection or handover. The mobile station should perform scheduling for a scan period or a sleep period to determine initial network entry to the base station or the possibility of handover to a target base station.

The mobile station acquires synchronization with a serving base station and downlink parameters during initial network entry (S303). The serving base station means a base station, which provides a service in a network where the mobile station currently intends to enter. The mobile station which has acquired synchronization with the serving base station acquires uplink parameters to the serving base station (S304), performs a ranging procedure with the serving base station and adjusts uplink parameters (S305). The mobile station and the serving base station form basic capability for communication through the above steps (S306). The serving base station applies the mobile station and exchanges a key (S307).

Thus, the mobile station is subscribed to the serving base station (S308), and IP connection is established in the mobile station (S309).

The serving base station performs a communication procedure of the mobile station by transmitting action parameters to the mobile station (S310). Also, connection between the mobile station and the serving base station is established (S311), so that the mobile station and the base station can perform normal operation (S312). The mobile station continues to search a neighboring base station while the serving base station is performing the normal operation (S313). This is to search a base station that can provide a better service due to service quality provided by the serving base station, which may be deteriorated as the mobile station moves away from the serving base station. Accordingly, a neighboring base station, which provides a better service than that of the serving base station, is referred to as a target base station. The mobile station performs handover by searching the target base station.

Generally, handover occurs when the mobile station moves a cell region from the serving base station to the target base station. Handover means that the mobile station converts a radio interface, a service flow and a network node from the serving base station to the target base station, and starts as the mobile station, the serving base station and a network manager determine it (S314).

The mobile station selects the target base station (S315), and acquires synchronization with the target base station and downlink parameters (S316). The mobile station acquires uplink parameters of the target base station (S317), and adjusts ranging and uplink parameters with the target base station (S318). At this time, if the mobile station has previously received NBR-ADV message including identifier of the target base station, its frequency, and its uplink/downlink channel descriptors (UCD/DCD), scan and synchronization procedures can be simplified. If the target base station has received handover report from the serving base station through a backbone network, it can provide initial ranging chance to an uplink-map (UL-MAP).

The mobile station and the target base station form basic capability through the above steps (S319), and start a network re-entry procedure by performing ranging. Also, the mobile station is re-subscribed and re-connected to the target base station (S320). Thus, the mobile station is subscribed to the target base station (S321), and IP connection of the target base station is re-established in the mobile station (S322). As a result, the target base station serves as the serving base station to provide a service to the mobile station.

Handover in FIG. 3 will be described again. The mobile station can select a cell through information of neighboring base stations obtained by scanning, and can determine handover from the serving base station to the target base station. If the mobile station determines handover, it performs synchronization with the target base station and a ranging procedure. Afterwards, reauthorization for the mobile station is performed. At this time, the target base station can request the serving base station to provide information of the mobile station, through a backbone message.

The handover and network re-entry procedures can be simplified in accordance with information owned by the target base station and related to the mobile station. Also, several network entry procedures can be omitted in accordance with the information of the mobile station, which is owned by the target base station.

Figure 4:
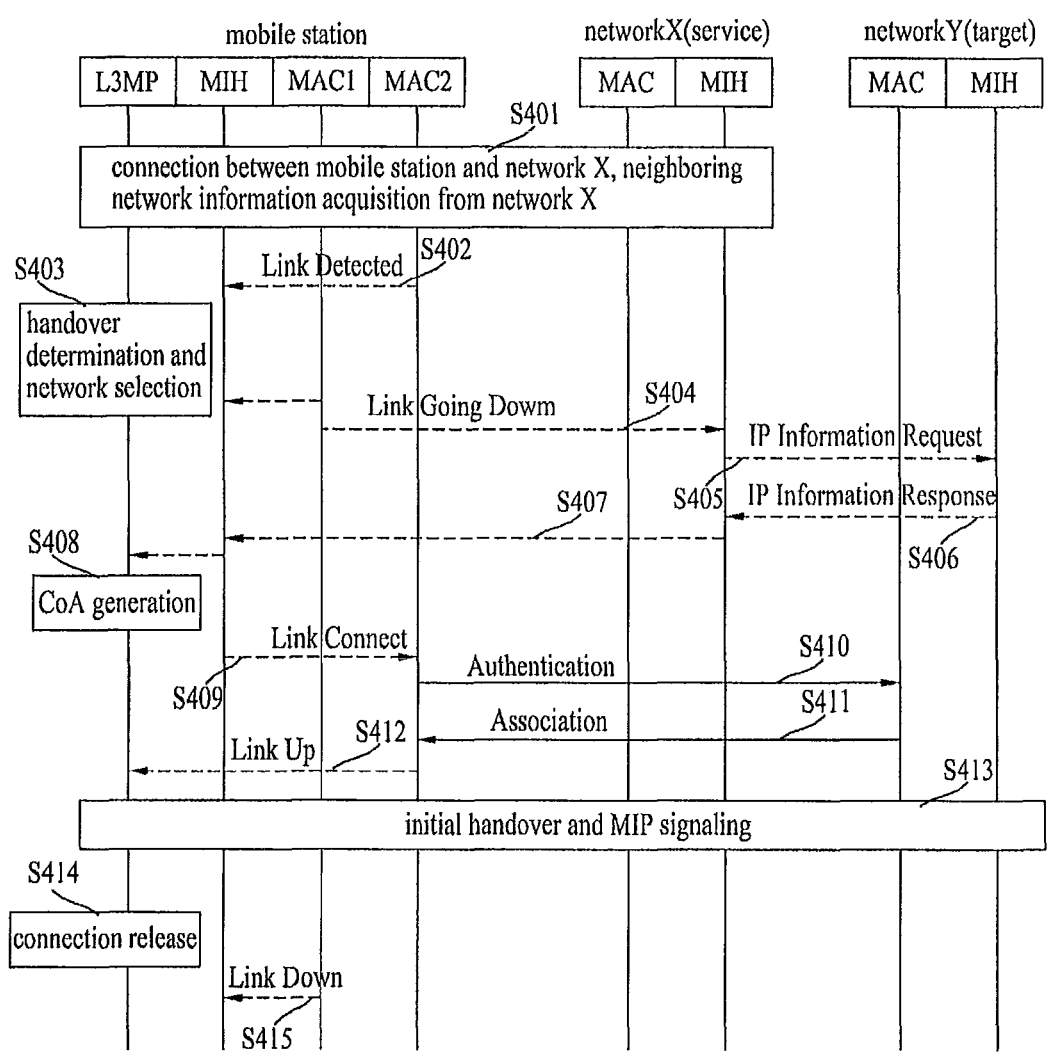
FIG. 4 is a flow chart illustrating handover between heterogeneous radio access networks based on a media independent handover in a multi-mode mobile station in accordance with one embodiment of the present invention.

FIG. 4 is a flow chart illustrating handover between heterogeneous radio access networks based on a media independent handover in a multi-mode mobile station in accordance with one embodiment of the present invention.

Figure 1:
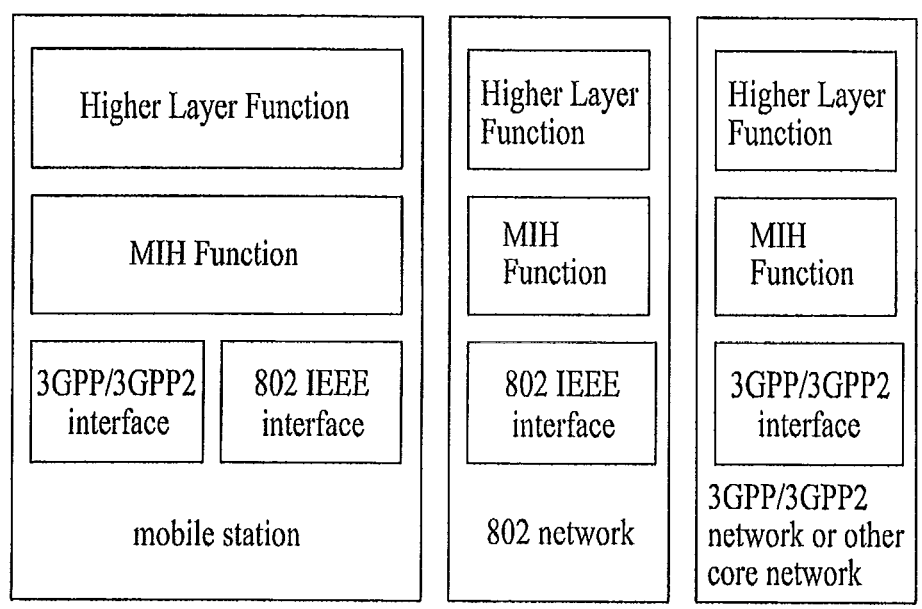
FIG. 1 is a diagram illustrating a protocol layer schematic view of a multi-mode mobile station, IEEE 802 based network, and 3GPP/3GPP2 network.

Referring to FIG. 4, the multi-mode mobile station can acquire neighbor network information from a network X while maintaining connection with the network X and performing communication. At this time, the mobile station can acquire information related to second layer security, such as authentication method and encryption algorithm, through an information service defined in the MIH function of the protocol layer of FIG. 1 (S401).

At this time, the mobile station according to the embodiment of the present invention can support a multi-mode. MAC layer of the mobile station includes a MAC 1 layer and a MAC 2 layer. The MAC 1 layer can perform communication with the network X, and the MAC 2 layer can support communication with a network Y. In other words, even in case that handover occurs between heterogeneous networks, the mobile station can transmit and receive a message to and from each heterogeneous network.

The mobile station receives a signal from the neighboring network through scanning, and performs network search and selection procedures (S402). At this time, L3 MP corresponding to an upper layer of the mobile station determines handover and selects a handover target network (S403).

If a signal level received from the current serving network X is decreased less than a given level, MAC 1 interface of the mobile station reports it to the MIH entity of the upper layer through a local event trigger, and notifies it to the MIH entity of the network X through a remote event trigger (S404).

The MIH entity of the network X transmits IP information request message to the MIH entity of the network Y, which will perform handover, for requesting IP information of network Y (S405). The network Y, which has received the IP information request message, transmits IP information response message including IP information of network Y to the MIH entity of the network X (S406). The network X receives the IP information from the network Y and transmits the IP information of network Y to the MIH entity of the mobile station. Then, the MIH of the mobile station transfers the IP information of network Y to the L3 MP (S407).

The mobile station which has received the IP information of the network Y can generate CoA based on the IP information, and can previously obtain IP address which will be used when handover to the network Y is performed (S408). For handover to the network Y, the MIH entity of the mobile station commands the MAC entity of the corresponding interface to perform a procedure for second layer handover (S409).

The mobile station performs the second layer handover procedure to the network Y by performing a network initial subscription procedure including authentication and security related procedures with the network Y. Namely, the MAC 2 layer of the mobile station requests the MAC layer of the network Y to perform the authentication procedure (S410), and the MAC layer of the network Y transmits a message, which allows association, to the MAC 2 layer of the mobile station in response to the request of the authentication procedure (S411).

If the mobile station completes the second layer handover (network subscription procedure) with the network Y, the MAC layer of the mobile station reports the completion of the second layer handover to the upper layer, i.e., L3 MP to perform third layer handover (S412). The mobile station performs the third layer handover including a subscription procedure of CoA acquired from a new network (for example, network Y) to a home agent (HA), and restarts communication with the new network if handover completes (S413). The mobile station releases connection with the network X, which is a previous network (S414, S415).

Security requirements required to preferably perform the embodiments of the present invention will be described before the embodiments of the present invention are described.

For example, a security credential shared for a long time by the mobile station and the network in the heterogeneous radio access technology such as 3GPP can be stored in SIM card or UICC card of the multi-mode mobile station. The heterogeneous radio access network other than the IEEE 802.16 network exemplarily described in the embodiment of the present invention is associated with an authentication server based on various EAP methods for notifying success or failure of protected authentication. Also, the IEEE 802.16 network preferably forms a roaming agreement for association with 3GPP network or other heterogeneous radio access networks. In view of the embodiment of the present invention, it is preferable that security contexts provided by the heterogeneous radio access network provide a security level (for example, length of key) equivalent to that required in the IEEE 802.16 network. Also, it is preferable that information as to whether authentication exchanged between a serving network authentication server and a target network authentication server has been successfully performed or protection of security contexts is provided. For protection of user identifiers (for example, IMSI and TMSI), it is preferable that the identifiers are not disclosed.

Figure 5:
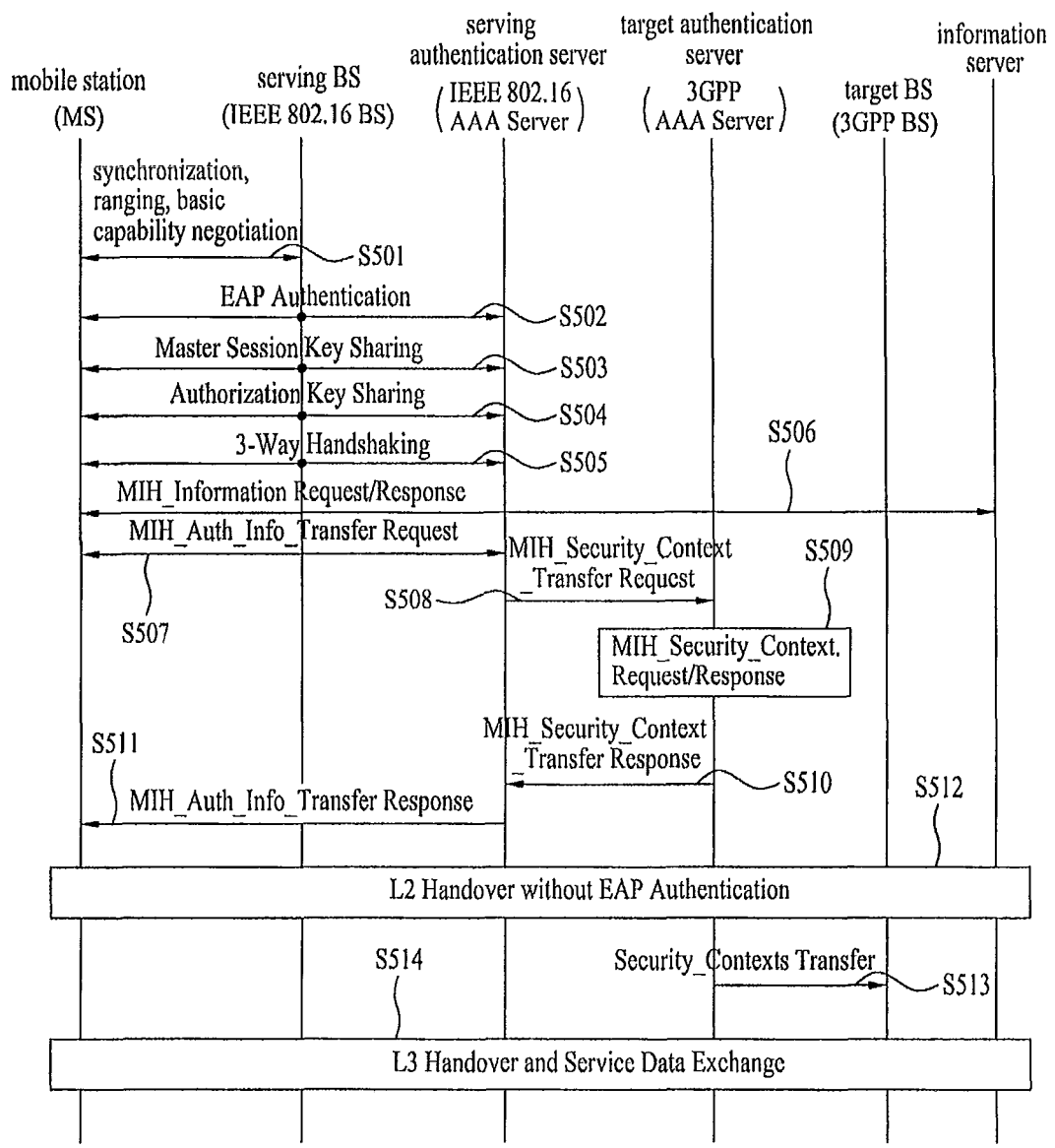
FIG. 5 is a flow chart illustrating a method of establishing fast security association when handover is performed between heterogeneous radio access networks in accordance with one embodiment of the present invention.

FIG. 5 is a flow chart illustrating a method of establishing fast security association when handover is performed between heterogeneous radio access networks in accordance with one embodiment of the present invention.

In FIG. 5, it is supposed that handover is performed between heterogeneous radio access networks. The IEEE 802.16 system will be described as a network which currently provides a service, and the network which has adopted 3GPP system will be described as another network which intends to perform handover. However, it is to be understood that a similar handover procedure can be performed when the mobile station handover from the 3GPP network to the IEEE 802.16 network. Besides, the similar procedure can be applied to the method of establishing fast security association when handover is performed between heterogeneous radio access networks in the other networks.

Furthermore, the authentication server is one of network entities, and can generate and distribute keying materials related to authentication and security of actual users. The authentication server is an entity related to authentication, key management, and billing of each mobile station. Also, an information server is one of the network entities, and can provide information of neighboring heterogeneous and/or homogeneous networks. Especially, the information server is for media independent handover (MIH) between heterogeneous networks. In other words, the information server can acquire information of the heterogeneous networks before handover so as to perform handover between heterogeneous networks and provide the acquired information to the mobile station.

The MIH function is a logical entity, and assists to determine handover between heterogeneous radio access networks. This MIH function may exist in the mobile station, the base station and the authentication server, and allows information of establishment or state of access networks near the mobile station to be exchanged between the mobile station and the networks.

It is to be understood that terminologies used in the embodiment of the present invention are to effectively describe technical spirits of the present invention. It will be apparent to those skilled in the art that other terminologies can be used as those expressing the technical spirits within the equivalent scope. Also, the base station which current provides a service can be referred to as a serving base station, the authentication server of the network to which the mobile station and the base station currently belong can be referred to as the serving authentication server, and the current network can be referred to as the serving network. In the embodiment of the present invention, the serving base station can be used as a serving authentication station. The serving authentication station includes the serving base station.

Figure 2:
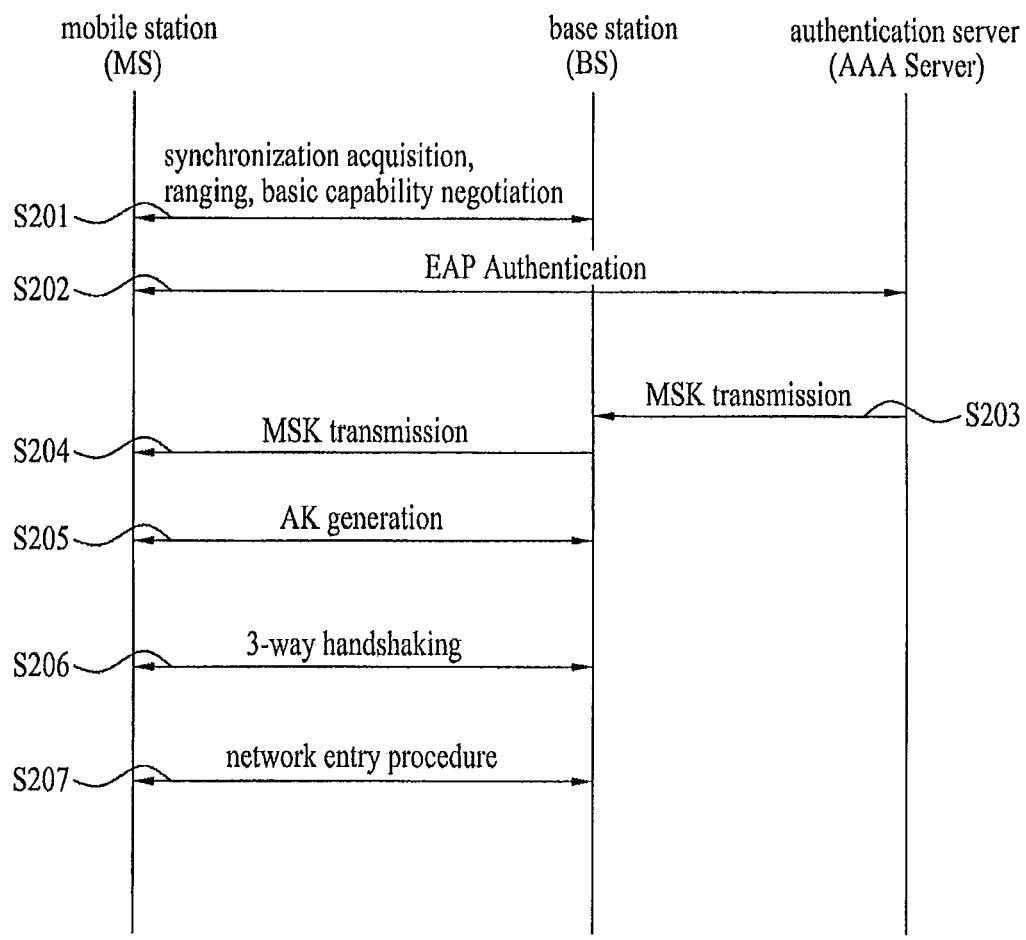
FIG. 2 is a flow chart illustrating an authentication procedure of a mobile station in IEEE 802.16 system according to the related art.

Referring to FIG. 5, at the initial step, the mobile station performs the procedure of FIG. 2 with the base station which currently receives a service and the authentication server of the network to which the base station belongs. Namely, the multi-mode mobile station accesses the IEEE 802.16 network and then shares a master session key and authorization key through the EAP based authorization method and also shares TEK through 3-way handshaking (S501~S505). Through the steps S501~S505, the IEEE 802.16 network authentication server can recognize whether authentication of the mobile station has been successfully performed, and can use it when handover is later performed between heterogeneous radio access networks.

In the IEEE 802.16e system which is one of the systems exemplarily described in the embodiment of the present invention, the basic capability negotiation procedure is performed in such a manner that the mobile station reports its basic capabilities to the network through the SBC-REQ message after ranging ends and the network reports a common part of the capabilities of the network and the mobile station to the mobile station through the SBC-RSP message in response to the SBC-REQ message. For fast security association when handover is performed between heterogeneous radio access networks suggested in the embodiment of the present invention, the SBC-REQ and the SBC-RSP messages can include inter-RAT authorization policy support parameters. Accordingly, when handover is performed between heterogeneous radio access networks, the mobile station and the target network authentication server should perform a new authorization procedure. This authorization procedure can follow an authorization method supported by the target network authentication server.

The corrected SBC-REQ and SBC-RSP messages can be used in the step S501. The following Table 5 illustrates an example of the corrected SBC-REQ and SBC-RSP messages.

TABLE 5

SBC-REQ/RSP{
Mandatory parameter
   Physical Parameters Supported
   Bandwidth Allocation Support
Optional parameter
   Capabilities for construction and transmission of MAC PDUs
   PKM Flow Control
   Authorization Policy Support
   Inter_RAT Authorization Policy Support
   Maximum Number of Supported Security Association
   Security Negotiaiton Parameters
   HMAC-CMAC Tuple
}

The corrected SBC-REQ and SBC-RSP messages of Table 5 can include inter-RAT authorization policy support parameter. The inter-RAT authorization policy support parameter specifies whether to support an authorization policy to be negotiated and synchronized between the mobile station and the network when the mobile station performs handover to another radio access network. The inter-RAT authorization policy support parameter is a field included in SBC-REQ/RSP management encoding, similarly to the conventional authorization policy support.

The following Table 6 illustrates an example of the inter-RAT authorization policy support parameter used in the embodiment of the present invention.

TABLE 6

| Type | Length | Value | Region |
|---|---|---|---|
| | 1 | Bit #0: IEEE 802.16m Privacy Supported<br>Bits #1-7: Reserved, shall be set to zero | SBC-REQ,<br>SBC-RSP |

| Type | Length | Value |
|---|---|---|
| | 1 | Bit #0: RSA-Based Authorization at Inter-RAT Handover<br>Bit #1: EAP-Based Authorization at Inter-RAT Handover<br>Bits #2-#7: Reserved, shall be set to zero |

If the inter-RAT authorization policy support parameter of Table 6 is omitted in Table 5, establishment of fast security association is not supported when handover is performed between heterogeneous radio access networks, and the mobile station and the network should use the conventional IEEE 802.16 security as an authorization policy, wherein the conventional IEEE 802.16 security uses X.509 credential and RSA public key encryption algorithm, or EAP authentication method. Accordingly, if handover is performed between heterogeneous radio access networks, the mobile station and the target network authentication server should perform a new authentication procedure. This authentication procedure follows an authentication method supported by the target network authentication server.

The security negotiation parameters field between heterogeneous radio access networks specifies security capability to be negotiated before the authorization procedure if handover is performed for the network, which uses different radio access technologies.

An example of corrected security negotiation parameter that can be used in the preferred embodiment of the present invention is as illustrated in Table 7.

TABLE 7

| Type | Length | Value | Region |
|---|---|---|---|
| 25 | 1 | The compound field contains the subattributes as defined in the table below | SBC-REQ, SBC-RSP |

| Subattribute | Contents |
|---|---|
| PKM Version Support | Version of Privacy Sublayer Supported |
| Authorization Policy Support | Authorization Policy to Support |
| Inter-RAT Authorization Policy Support | Inter-RAT Authorization Policy to Support |
| Message Authentication code Mode | Message Authentication Code to Support |
| PN Window size | Size Capability of the Receiver PN Window per SAID |

The corrected security negotiation parameter field specifies security capability to be negotiated before the initial authorization procedure or reauthorization procedure is performed. PKM version support field specifies PKM version. Namely, it means that both the mobile station and the network should negotiate one PKM version.

An example of the PKM version support field included in the corrected security negotiation parameter field used in the embodiment of the present invention is as illustrated in Table 8.

TABLE 8

| Type | Length | Value |
|---|---|---|
| 25.1 | 1 | Bit #0: PKM Version 1 |
| | | Bit #1: PKM Version 2 |
| | | Bit #2: PKM Version 3 |
| | | Bits #3-#7: Reserved, shall be set to zero |

The messages used during handover between heterogeneous radio access networks and the parameters included in the messages as illustrated in Table 5 to Table 8 can be used in the step S501 of FIG. 5.

Referring to FIG. 5, the multi-mode mobile station maintains connection with the IEEE 802.16 network, and can acquire neighbor network information. In the embodiment of the present invention, the mobile station can request information of neighboring heterogeneous networks using a MIH_Information Request message, and can receive the information of neighboring heterogeneous networks through a MIH_Information Response message (S506).

In the step S506, the MIH_Information Request message is used when the mobile station requests information of the network which the mobile station intends to perform handover. Also, the MIH_Information Request message can be used to identify the authorization method supported by the corresponding network. The MIH_Information Response message is used to provide information of the network to the mobile station. For example, the MIH_Information Response message can include a list of available networks, geographical location information, transmission technology information, identifier of network provider, network provider name, IP version, roaming partner list, service level list, neighbor network information, link layer security information, link layer service quality parameter and router information.

The mobile station can receive the neighbor network information through the MIH_Information Response message. Also, the serving network can periodically transmit the MIH_Information Response message to the mobile stations in a broadcasting type, wherein the MIH_Information Response message is transferred from the information server. Accordingly, the mobile station can obtain the neighboring network information even in case that it normally performs communication with the serving network. In other words, the mobile station can receive security related parameters of the link layer (second layer) such as the encryption algorithm and the authorization method of the neighboring network through the step S506.

The mobile station cannot directly request the information of the neighboring network to the information server. In other words, the mobile station can transmit the request message to the information server through the serving base station and receive the response message through the serving base station. For example, the message transmission path is performed in such a manner that the request message is transmitted from the mobile station to the serving base station, from the serving base station to the serving network authentication server, and from the serving network authentication server to the information server. It will be apparent that the response message is transmitted in reverse order of that of the request message.

Table 9 illustrates an example of the MIH_Information Request and MIH_Information Response messages.

TABLE 9

| Syntax | Size | Contents |
|---|---|---|
| MIH_Information Request{ | | |
| Info_Query_Filter | | Type of information request network (for example, IEEE 802.16, GSM, CDMA, etc.) |
| Infor_Query_Parameters | | Detailed parameters of request information (for example, link layer information, upper layer information, security related information, etc.) |
| } | | |
| MIH_Information Response{ | | |
| Info_Query_Filter | | Type of network (for example, IEEE 802.16, GSM, CDMA, etc.) |
| MIH_REPORT | | Detailed parameters of information (for example, neighboring network related information, link layer information, upper layer information, security related information, etc.) |
| Status | | Information transfer status (for example, Success or failure) |
| } | | |

The MIH_Information Request message of Table 9 is a remote MIH message of the IEEE 802.21 standard, and is transferred from the MIH entity to the MIH entity of the current serving network. The MIH_Information Request message can be used so that the mobile station requests target network information or identifies an authorization method supported by the corresponding network.

The MIH_Information Response message of Table 9 is used to provide network information to the mobile station. In other words, the MIH_Information Response message can include at least one of a list of available networks, geographical location information, transmission technology information, identifier of network provider, network provider name, IP version, roaming partner list, service level list, neighbor network information, link layer security information, link layer service quality parameter and router information.

The mobile station can receive the neighbor network information through the step S506. Also, as the serving network periodically transmits the MIH_Information Response message to the mobile stations in a broadcasting type, the mobile station can obtain the neighboring network information even in case that it normally performs communication with the serving network. In other words, the mobile station can receive security related parameters of the link layer (second layer), such as the encryption algorithm and the authorization method of the neighboring network through the step S506.

Afterwards, the multi-mode mobile station can receive the signal from the neighboring network through scanning and perform network search and selection procedure. The mobile station can determine the 3GPP network as a potential handover target network through scanning. Of course, the 3GPP network is only exemplary, and other heterogeneous network can be established as the target network. The MIH entity of the authentication server of the IEEE 802.16 network requests the MIH entity of the 3GPP network where handover will be performed, to provide IP information, and transfers the IP information to the mobile station. The IP address is used during handover of the mobile station.

While the multi-mode mobile station is receiving the service, the level of the signal received from the IEEE 802.16 network can be deteriorated at a given level or less. At this time, the MIH entity of the mobile station requests the MIH entity of the IEEE 802.16 network authentication server to transmit authorization related information of the mobile station to the MIH entity of the 3GPP network authentication server, through the MIH_Auth_Info_transfer Request message, wherein the 3GPP network is the target network (S507).

The following Table 10 illustrates an example of the MIH_Auth_Info_Transfer Request message used in the embodiment of the present invention.

TABLE 10

| Syntax | Size | Contents |
| --- | --- | --- |
| MIH_Auth_Info_Transfer Request{ | | |
| Current_Link_Identifier | | Current access network identifier |
| Target_Link_Identifier | | Target access network identifier |
| Current_Authentication_Server_Identifier | | Identifier of current access network authentication server |
| Target_Authentication_Server_Identifier | | Identifier of target access network authentication server |
| Mobile_Terminal_Identifier | | Identifier of mobile station (for example, MAC address, IMSI, etc.) |
| Authorization Status Transfer Request | | |
| } | | |

Referring to FIG. 10, the MIH_Auth_Info_transfer Request message is a remote MIH message, and can include a current access network identifier, a target access network identifier, an identifier of a current access network authentication server, an identifier of a target access network authentication server, and an identifier of the mobile station. In other words, the mobile station can request security contexts used in the target network by transmitting the MIH_Auth_Info_transfer Request message to the serving network authentication server.

Referring to FIG. 5, the MIH entity of the serving network authentication server (for example, IEEE 802.16 network authentication server) can request the authentication server of the target network (for example, 3GPP network) to provide security contexts of the target network, through the MIH_Security_Context_Transfer Request message (S508).

The following Table 11 illustrates an example of the MIH_Security_Context_Transfer Request message used in the step S508.

TABLE 11

| Syntax | Size | Contents |
| --- | --- | --- |
| MIH_Security_Context_Transfer Request{ | | |
| Mobile_Terminal_Identifier | | Identifier of mobile station (for example, MAC address, IMSI, etc.) |
| Authorization Status | | For example, Success, Fail, Reason of Fail, etc. |
| List of Security_Contexts | | |
| } | | |

The security contexts mean a set of parameters, which connect keys of each system with each other considering security when the keys are used. A counter can exist in the security contexts, wherein the counter identifies that encryption is not used more than one time and also identifies key duration. The authentication server can receive a new key to continuously receive a service when context of key ends.

In the step S508, the MIH_Security_Context_Transfer Request message can be regarded as a local message in case of the same operator, and can be regarded as a remote message in case of different operators. The MIH_Security_Context_Transfer Request message can further include the authorization result of the serving network authentication server for the mobile station and information of the mobile station.

The MIH of the 3GPP network authentication server requests the upper layer protocol of the 3GPP network authentication server to provide security contexts to be transferred to the mobile station if MIH_Security_Context_Transfer.Request primitive is received.

At this time, the MIH of the 3GPP network authentication server can use MIH_Security_Context.Request. The upper layer of the 3GPP network authentication server can generate security contexts to be used in the target network, i.e., 3GPP network, through association with HSS. Also, the upper layer of the 3GPP network authentication server can transfer MIH_Security_Context.Response primitive including the generated security contexts to the MIH of the 3GPP network authentication server. In this case, if the target network does not use EAP as basic access authorization, the 3GPP network authentication server can generate a key in accordance with information of a user or mobile station, which is received from the serving network authentication server, by using a key generation algorithm of a unique entity of the target network such as HSS (S509).

Table 12 illustrates an example of MIH_Security_Context.Request and MIH_Security_Context.Response messages used in the embodiment of the present invention.

TABLE 12

| Syntax | Size | Contents |
|---|---|---|
| MIH_Security_Context.Request{ | | |
|   List of Security_Contexts | | |
| } | | |
| MIH_Security_Context.Response{ | | |
|   Security_contexts | | |
| } | | |

In the step S509, the MIH_Security_Context.Request message is a local message, and is used when the MIH entity of the target network authentication server requests the upper layer to provide security contexts. In the step S509, although the MIH_Security_Context.Request/Response messages are used between the MIH and the upper layer, they may be used between the MIH and the lower layer (e.g. MAC layer) in accordance with user requirements and system condition.

The MIH entity of the 3GPP network authentication server, which has acquired the security contexts used in the target network, can transmit the security contexts to the MIH entity of the IEEE 802.16 network authentication server by using the MIH_Security_Context_Transfer Response message (S510).

The following Table 13 illustrates an example of the MIH_Security_Context_Transfer Response message format.

TABLE 13

| Syntax | Size | Contents |
|---|---|---|
| MIH_Security_Context_Transfer Response{ | | |
|   Mobile_Terminal_Identifier | | Identifier of mobile station (for example, MAC address, IMSI, etc.) |
|   Security_Contexts | | |
| } | | |

Referring to Table 13, the MIH_Security_Context_Transfer Response message can include the identifier of the mobile station and the security contexts in the target network.

The MIH entity of the IEEE 802.16 network authentication server, which has acquired the security contexts used in the target network in the step S510, can transmit the security contexts to the mobile station by using the MIH_Auth_Info_Transfer Response message (S511).

The following Table 14 illustrates an example of the MIH_Auth_Info_Transfer Response message format.

TABLE 14

| Syntax | Size | Contents |
|---|---|---|
| MIH_Auth_Info_Transfer Response{ | | |
|   Current_Link_Identifier | | Serving access network identifier |
|   Target_Link_Identifier | | Target access network identifier |
|   Target_Authentication_Server_Identifier | | Identifier of target access network authentication server |
|   Security_Context | | Security contexts used by target network authentication server (for example, AND, KC in case of GSM, and RAND, AUTN, CK, LK, etc. in case of UMTS) |
|   Protected Pseudonym | | For example, TMSI |
| } | | |

Referring to Table 14, the MIH_Auth_Info_Transfer Response message can include a serving access network identifier, a target access network identifier, an identifier of a target access network authentication server, security contexts of the target network, and protected pseudonym (for example, TMSI), etc.

The multi-mode mobile station can perform second layer (or link layer) handover with the target network. The mobile station can establish fast security association with the target network based on information related to the security contexts acquired through the steps S507~S511. For example, in the subscription procedure to the target network (for example, 3GPP network), the mobile station does not need to perform the authentication procedure newly and can omit a considerable part of the security related procedure for obtaining key. Thus, the mobile station can establish fast security association with the target network without authentication procedure when handover is performed between heterogeneous networks. Also, the handover procedure can be simplified. If the second layer handover ends, the MAC layer of the mobile station reports completion of the second layer handover to the upper layer to perform third layer handover (S512).

The authentication server of the 3GPP network transfers security contexts required for data transmission and reception to the authenticator, and access point (for example, base station or eNode B) receives the security contexts. Accordingly, the base station prepares communication with the mobile station, which has performed handover (S513).

The multi-mode mobile station can perform third layer handover including the subscription procedure of CoA to the home agent, wherein the CoA has been acquired from the 3GPP. The mobile station transmits and receives data to and from the 3GPP network if handover ends, and releases connection with the previous serving network, i.e., IEEE 802.16 network (S514).

Figure 6:
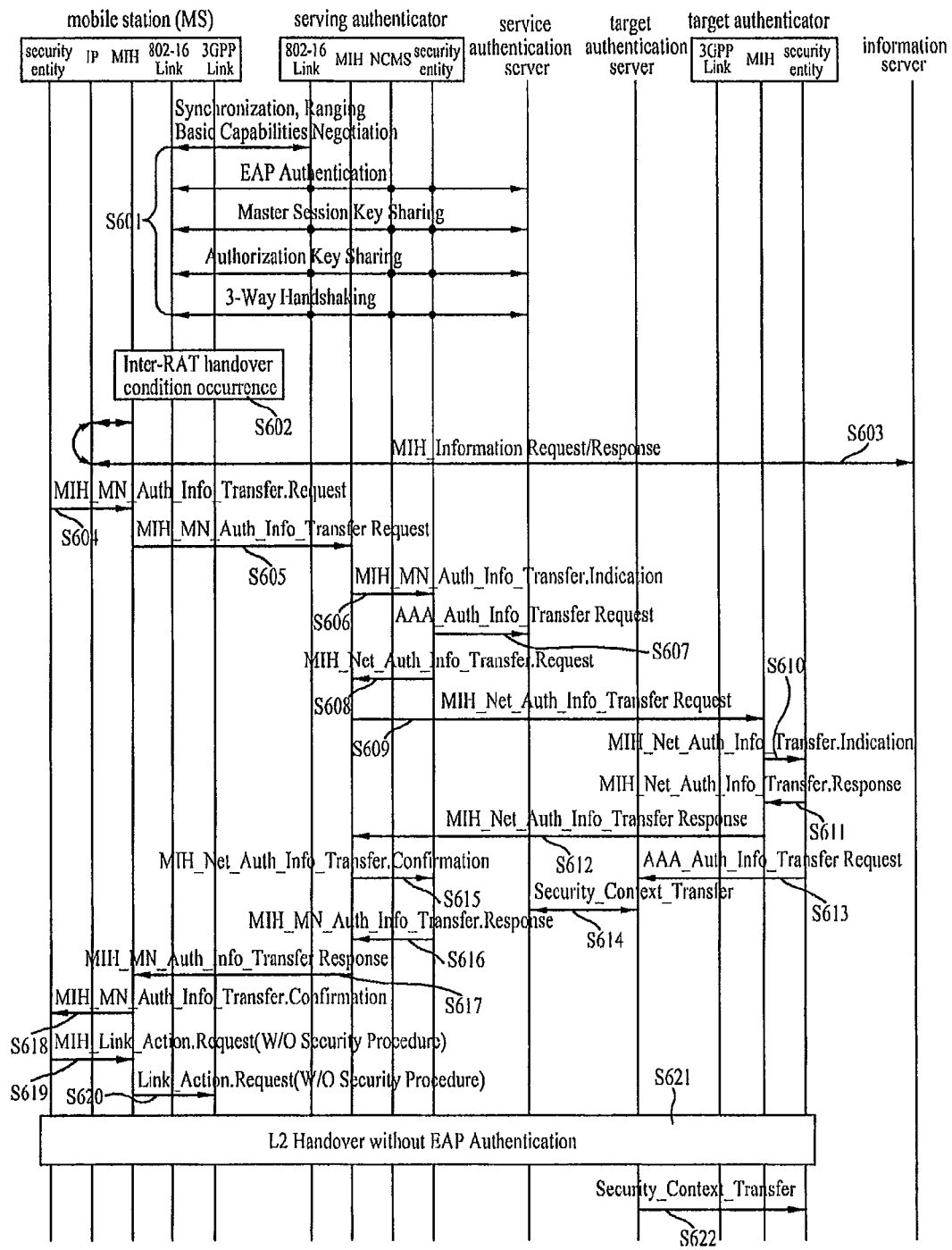
FIG. 6 is a flow chart illustrating a method of establishing fast security association when handover is performed between heterogeneous radio access networks in accordance with another embodiment of the present invention.

FIG. 6 is a flow chart illustrating a method of establishing fast security association when handover is performed between heterogeneous radio access networks in accordance with another embodiment of the present invention.

Referring to FIG. 6, the mobile station (MS) includes a security entity, IP layer, MIH entity, IEEE 802.16 link, and 3GPP link. Also, a serving authenticator includes IEEE 802.16 link, MIH entity, NCMS entity, and a security entity. At this time, the serving authenticator can be referred to as a serving base station. The serving authenticator can be used as a high concept including the serving base station. The authentication server of the network, which currently provides the service to the mobile station and includes the serving authenticator, will be referred to as the serving authentication server.

The network for handover will be referred to as a target network. The target network includes a target authenticator.

The target authenticator includes 3GPP link, MIH entity, and security entity. The target authenticator can be referred to as a target base station, and can be used as a high concept including the target base station. Also, the target network includes a target authentication server, which is a network entity for performing authentication and billing of the mobile station in the region managed by the corresponding server.

The information server is one of network entities, and means a server that provides information of networks adjacent to the mobile station. However, it is supposed that the serving authentication server and the target authentication server have no MIH function in FIG. 6 according to another embodiment of the present invention.

When the mobile station intends to perform handover for heterogeneous radio access networks, it can perform handover while providing fast security association using MIH function of an access point (for example, base station) if the serving authentication server and the target authentication server do not provide MIH function.

Referring to FIG. 6, the multi-mode mobile station establishes a link through an access procedure of the IEEE 802.16 system. In this case, the authentication procedure is performed through the 802.16 network (S601).

The step S601 is similar to the procedure described in FIG. 2. Accordingly, the mobile station performs master session key sharing and AK sharing through EAP based authentication, and TEK sharing through 3-way handshaking by accessing the IEEE 802.16 network. As a result, the serving authentication server holds whether authentication of the mobile station has been successfully performed, and can use it later during handover between heterogeneous radio access networks.

Handover (Inter-RAT) for other type of networks may be performed in accordance with the status of the radio environment or network (S602).

The mobile station requests information of adjacent heterogeneous networks by transmitting MIH_Information.Request message to the network entity, i.e., information server, and the information server transmits neighboring heterogeneous network information to the mobile station through the MIH_Information.Response message (S603).

The mobile station can recognize available network for handover through the step S603. Also, the mobile station performs a procedure of acquiring information related to handover between heterogeneous radio access networks. The information acquired by the mobile station can include security related information. The security related information can include information as to whether the authentication result can pass from the current network to the heterogeneous radio access network intended for handover.

If the target heterogeneous radio access network intended for handover receives the authentication result from the current serving network in accordance with the information acquired by the mobile station, the security entity of the mobile station transfers MIH_MN_Auth_Info_Transfer.request primitive to the MIH entity of the mobile station so as to request the authentication result through the current point of attachment (S604).

The following Table 15 illustrates an example of MIH_MN_ Auth_Info_Transfer.request primitive format.

TABLE 15

| Syntax | Size | Contents |
| --- | --- | --- |
| MIH_MN_auth_Info_Transfer.request{ | | |
| Current_Link_Identifier | | Serving access network identifier |
| Target_Link_Identifier | | Target radio access network identifier |
| Current_Authentication_Server_Identifier | | Identifier of serving access network authentication server |
| Target_Authentication_Server_Identifier | | Identifier of target access network authentication server |
| Mobile_Treminal_Identifier | | Identifier of mobile station (for example, MAC address, IMSI, etc.) |
| Authorization Status Transfer Request | | |
| } | | |

Referring to Table 15, the MIH_MN_Auth_Info_Transfer.request primitive can include a serving access network identifier, a target access network identifier, an identifier of a serving access network authentication server, an identifier of a target access network authentication server, and an identifier of the mobile station.

The MIH entity of the mobile station transfers the information included in the MIH_MN_Auth_Info_Transfer.request primitive to the serving network authenticator (802.16 Authenticator). At this time, since the serving network authenticator is a remote MIH entity, the mobile station uses MIH_MN_Auth_Info_Transfer.request protocol message (S605).

In the step S605, the mobile station can transmit the MIH_MN_Auth_Info_Transfer.request protocol message through a control plane or a data plane. For example, if the mobile station uses the control plane, MAC management message can be used. If the mobile station uses the data plane, the second layer (Layer 2) uses Ethernet frame (Ether type=MIH) and the third layer (Layer 3) uses IP packet so as to transfer the MIH protocol message to the serving network authenticator.

The MIH entity of the serving authenticator which has received the remote MIH protocol message can notify a security entity of the upper layer that it has received the remote MIH protocol message. Namely, the MIH entity of the serving authenticator can notify the security entity that it has received the remote MIH protocol message, by using MIH_MN_Auth_Info_Transfer.Indication primitive (S606).

The following Table 16 illustrates an example of MIH_MN_ Auth_Info_Transfer.Indication primitive format.

TABLE 16

| Syntax | Size | Contents |
| --- | --- | --- |
| MIH_MN_auth_Info_Transfer.Indication { | | |
| Current_Link_Identifier | | Serving access network identifier |

TABLE 16-continued

| Syntax | Size | Contents |
|---|---|---|
| Target_Link_Identifier | | Target access network identifier |
| Current_Authentication_Server_Identifier | | Identifier of serving access network authentication server |
| Target_Authentication_Server_Identifier | | Identifier of target access network authentication server |
| Mobile_Terminal_Identifier | | Identifier of mobile station (for example, MAC address, IMSI, etc.) |
| Authorization Status Transfer Request } | | |

The serving authenticator which has received the MIH_MN_ Auth_Info_Transfer.Indication primitive transfers AAA_Auth_Info_Transfer Request protocol message to the authentication server (AAA server) of the serving network. In other words, the security entity of the serving authenticator transmits a message requesting transmission standby of the authentication result to the serving authentication server (S607).

The security entity of the serving network transfers the MIH_Net_Auth_Info_Transfer.Request primitive to the MIH entity of the serving network authenticator (S608).

In the step S608, the MIH_Net_Auth_Info_Transfer.Request primitive can be used to notify that the serving network authentication server can pass the authentication result of the mobile station, which intends to perform handover (Inter-RAT) between heterogeneous networks, to the heterogeneous radio access network.

The following Table 17 illustrates an example of MIH_Net_ Auth_Info_Transfer.Request primitive format.

TABLE 17

| Syntax | Size | Contents |
|---|---|---|
| MIH_Net_Auth_Info_Transfer.Request{ | | |
| Current_Link_Identifier | | Serving access network identifier |
| Target_Link_Identifier | | Target access network identifier |
| Current_Authentication_Server_Indentifier | | Identifier of serving access network authentication server |
| Mobile_Termianl_Identifier | | Identifier of target access network authentication server |
| Target_Authentication_Server_Identifier | | Identifier of mobile station (for example, MAC address, IMSI, etc.) |
| } | | |

Referring to Table 17, the MIH_Net_Auth_Info_Transfer.Request primitive can include a serving access network identifier, a target access network identifier, an identifier of a serving access network authentication server, an identifier of a target access network authentication server, and an identifier of the mobile station.

The MIH_Net_Auth_Info_Transfer.Request protocol message triggered by the MIH_Net_Auth_Info_Transfer.Request primitive is transmitted to the MIH entity of the target authenticator. At this time, the MIH_Net Auth_Info_Transfer.Request protocol message is a remote MIH protocol message (S609).

Since the received MIH protocol message is a security related message, the MIH entity of the target network authenticator transfers the MIH protocol message to the security entity using the MIH_Net_Auth_Info_Transfer.Indication primitive (S610).

The following Table 18 illustrates an example of MIH_Net_ Auth_Info_Transfer.Indication primitive.

TABLE 18

| Syntax | Size | Contents |
|---|---|---|
| MIH_Net_Auth_Info_Transfer.Response { | | |
| Current_Authentication_Server_Identifier | | Identifier of serving network authentication server |
| Target_Authentication_Server_Identifier | | Identifier of target network authentication server |
| Mobile_Terminal_Identifier | | Identifier of mobile station (for example, MAC address, IMSI, etc.) |
| } | | |

The MIH_Net_Auth_Info_Transfer.Indication primitive can include an identifier of a serving network authentication server, an identifier of a target network authentication server, and an identifier of the mobile station.

The target network authenticator can transmit MIH_Net_Auth_Info_Transfer.Response primitive to the MIH entity of the target network authenticator to transmit a response to the received security related MIH primitive (S611).

The MIH entity of the target network authenticator, which has received the MIH_Net_Auth_Info_Transfer.Response primitive, can remotely transmit MIH protocol message (MIH_Net_Auth_Info_Transfer Response) to the MIH entity of the serving network authenticator (S612).

The following Table 19 illustrates an example of MIH_Net_ Auth_Info_Transfer.Response protocol message format.

TABLE 19

| Syntax | Size | Contents |
|---|---|---|
| MIH_Net_Auth_Info_Transfer.Response{ | | |
| Mobile_Terminal_Identifier | | Identifier of mobile station (for example, MAC address, |

TABLE 19-continued

| Syntax | Size | Contents |
|---|---|---|
| Security_Context | | IMSI, etc.) Security contexts used by target network authentication server (for example, RAND, Kc in case of GSM, and RAND, AUTN, CK, and IK in case of UMTS). |
| Protected Pseudonym | | For example, TMSI |
| Status | | |
| List of not Acquired Security Contexts | | |
| } | | |

Referring to Table 19, the MIH_Net_Auth_Info_Transfer Response protocol message can include an identifier of a mobile station and security contexts used in the target network authentication server.

In the step S612, the MIH_Net_Auth_Info_Transfer Response protocol message is a message transferred from the MIH entity of the target network to the MIH entity of the serving network to report the result of authentication related information transfer request. Parameters transferred to the MIH_Net_Auth_Info_Transfer Response protocol message include the status transferred by the authentication related information transfer request and a list of security contexts, which have not been transferred. Also, the parameters additionally include security contexts used in the target network and a protected temporary identifier.

In the step S610, the security entity which has received the security MIH protocol message (MIH_Net_Auth_Info_Transfer.Indication) transfers a message (AAA_Auth_Info_Transfer request) for requesting security context to the target network authentication server linked to the security entity (S613).

The target network authentication server can request the serving network authentication server currently connected with the mobile station to transmit security contexts and acquire the security contexts from the serving network authentication server. At this time, the security contexts can include an identifier of the mobile station, information as to authentication, and additional information (S614).

However, the steps S613 and S614 can be performed in the steps S610 and S611 in accordance with requirements of the user and the channel condition.

The MIH entity of the serving network authenticator, which has received the remote MIH protocol message, can notify the security entity of the serving network authenticator through MIH_Net_Auth_Info_Transfer.Confirmation primitive that it has received the remote MIH protocol message (S615).

The following Table 20 illustrates an example of the MIH_Net_Auth_Info_Transfer.Confirmation message.

TABLE 20

| Syntax | Size | Contents |
|---|---|---|
| MIH_Net_Auth_Info_Transfer.Confirmation{ | | |
| Mobile_Terminal_Identifier | | Identifier of mobile station (for example, MAC address, IMSI, etc.) |
| SecurityContext | | Security contexts used by target network authentication server (for example, RAND, Kc in case of GSM, and RAND, AUTN, CK, and IK in case of UMTS). |
| Protected Pseudonym | | For example, TMSI |
| Status | | |
| List of not Acquired Security Contexts | | |
| } | | |

The MIH_Net_Auth_Info_Transfer.Confirmation primitive can be used to provide the security contexts, which have been transferred from the authentication server of the target network, to the mobile station authenticated by the serving network. The MIH_Net_Auth_Info_Transfer.Confirmation primitive can include unique security contexts of the target network. Referring to Table 20, the MIH_Net_Auth_Info_Transfer.Confirmation primitive can include an identifier of the mobile station, security contexts used in the target network authentication server, and protected pseudonym (for example, TMSI), etc.

The security entity of the serving network authenticator, which has recognized that the target network can take necessary action, can transmit the MIH primitive message to the MIH entity, wherein the MIH primitive message includes security context. For example, the security entity can transfer the security contexts of the target network to the MIH entity using the MIH_MN_Auth_Info_Transfer.Response primitive (S616).

The MIH entity of the serving network generates a remote MIH protocol message (MIH_NN_Auth_Info_Transfer Response) including the security contexts of the target network and transmits it to the MIH entity of the mobile station (S617).

The following Table 21 illustrates an example of the MIH_MN_Auth_Info_Transfer Response message.

TABLE 21

| Syntax | Size | Contents |
|---|---|---|
| MIH_MN_Auth_Info_Transfer Response{ | | |
|    Current_Link_Identifier | | Serving network identifier |
|    Target_Link_Identifier | | Target network identifier |
|    Target_Authentication_Server_Identifier | | Identifier of target network authentication server |
|    Security Contexts | | Security contexts used by target network authentication server (for example, RAND. Kc in case of GSM, and RAND, AUTN, CK, and IK in case of UMTS). |
|    Protected Psuedonym | | For example, TMSI |
|    Status | | |
|    List of not Acquired Security Contexts | | |
| } | | |

Referring to FIG. 21, the MIH_MN_Auth_Info_Transfer Response message can include a serving network identifier, a target network identifier, an identifier of a target network authentication server, security contexts used in the target network, and protected pseudonym information.

The MIH entity of the mobile station transfers authentication related information of the target network to the security entity of the mobile station through the MIH_MN_Auth_Info_Transfer.Confirmation primitive (S618).

The MIH_MN_Auth_Info_Transfer.Confirmation primitive is used to transfer security parameters among the parameters included in the MIH_MN_Auth_Info_Transfer.Response protocol message.

The following Table 22 illustrates an example of the MIH_MN_Auth_Info_Transfer.Confirmation primitive format.

TABLE 22

| Syntax | Size | Contents |
|---|---|---|
| MIH_MN_Auth_Info_Transfer.Confirmation { | | |
|    Security Contexts | | Security contexts used by target network authentication server (for example, RAND, Kc in case of GSM, and RAND, AUTN, CK, and IK in case of UMTS). |
|    Protected pseudonym | | For example, TMSI |
|    Status | | |
|      List of not Acquired Security Contexts | | |
| } | | |

The MIH_MN_Auth_Info_Transfer.Confirmation primitive can include security contexts of the target network, protected pseudonym, and a list of unsolicited security contexts.

After transmission of information as to authentication of the mobile station and exchange of security contexts are performed successfully, the security entity transfers MIH_Link_Action.request (W/O Security Procedure) primitive to the MIH entity of the mobile station, wherein the MIH_Link_Action.request primitive is to request handover with the target network, i.e., initiation of link establishment procedure. At this time, the security entity notifies to the MIH that the security procedure, which may cause delay and have large load, such as new authentication and key exchange, may be omitted (S619).

The MIH of the mobile station transmits Link_Action.request (W/O security procedure) primitive for command of link establishment with the target network to 3GPP link of the mobile station (S620).

Through the above steps, the mobile station omits the security procedure such as new authentication and key exchange and quickly establishes a corresponding link (S621).

In the procedure of establishing the link, the target network authenticator can receive the security contexts of the mobile station from the target network authentication server. In other words, the target network authentication server can request the security contexts of the mobile station by transmitting Security_Context transfer message to the security entity of the target network authenticator (S622). In this case, the mobile station can receive the security contexts when a new link is established, or can previously receive them before a new link is established.

In the embodiment of the present invention described with reference to FIG. 6, the multi-mode mobile station of the IEEE 802.16 network performs handover for the 3GPP network. Similar procedure can be performed even in case that the mobile station performs handover from the 3GPP network to the IEEE 802.16 network. At this time, the parameters of the security contexts used in the 3GPP system can be replaced with those related to the IEEE 802.16 system.

It will be apparent that terminologies used in the embodiments of the present invention are to clarify technical spirits of the present invention and can be replaced with other terminologies in technical fields within the scope that does not depart from the technical spirits of the present invention. Also, it will be apparent that the parameters included in the messages used in the embodiments of the present invention can be replaced with other terminologies.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The embodiments of the present invention can be applied to various technologies of a broadband radio access system. In particular, the embodiments of the present invention can be applied to handover technology between heterogeneous radio access networks. Also, the embodiments of the present invention can be applied to a method of establishing fast security association before handover is performed.

What is claimed is:

1. A method of establishing security association between heterogeneous networks at a mobile station, the method comprising:

exchanging capability messages with a serving base station of a serving network, the capability messages including a parameter indicating whether to support an authorization policy between heterogeneous networks and a security negotiation parameter which indicates a security capability to be negotiated before an authorization procedure when a handover is performed between the heterogeneous networks;

a first step of receiving information of neighboring heterogeneous networks from an information server, the information comprising security related parameters of a link layer which includes an encryption algorithm and an authorization method of the neighboring heterogeneous networks;

a second step of transmitting a request message for requesting a serving network authentication server to transfer authentication related information to a target heterogeneous network where the mobile station intends to perform the handover among the neighboring heterogeneous networks, and for requesting security contexts used in the target heterogeneous network, wherein the request message includes an authorization result of the serving network authentication server for the mobile station and information about the mobile station;

a third step of receiving the security contexts which includes authentication related information and key related information of the target heterogeneous network from the serving network authentication server;

after receiving the security contexts, performing a link layer handover procedure with the target heterogeneous network without performing an authentication procedure with the target heterogeneous network; and performing a third layer handover procedure with the target heterogeneous network.

2. The method of claim 1, wherein the first step, the second step, and the third step are performed by a media independent handover (MIH) entity of the mobile station.

3. The method of claim 1, wherein the security contexts and the key related information are generated in a target network authentication server.

4. A method of establishing security association between heterogeneous networks at a serving base station of a serving network, the method comprising:

exchanging capability messages with a mobile station, the capability messages including a parameter representing whether to support an authorization policy between heterogeneous networks and a security negotiation parameter which indicates a security capability to be negotiated before an authorization procedure when a handover is performed between the heterogeneous networks;

a first step of receiving a request message from the mobile station, the request message requesting a serving network authentication server to transfer authentication related information to a target heterogeneous network where the mobile station intends to perform the handover among neighboring heterogeneous networks, and requesting security contexts used in the target heterogeneous network, wherein the request message includes an authorization result of the serving network authentication server for the mobile station and information about the mobile station;

a second step of transmitting the request message requesting authentication related information to an authentication server of the target heterogeneous network;

a third step of receiving the security contexts which includes authentication related information and key related information of the target heterogeneous network from the serving network authentication server; and a fourth step of transferring the security contexts to the mobile station, wherein, after receiving the security contexts by the mobile station, a link layer handover procedure is performed by the mobile station with the target heterogeneous network without performing an authentication procedure with the target heterogeneous network.

5. The method of claim 4, wherein the first step, the second step, and the third step are performed by a media independent handover (MIH) entity of the serving authentication server.

* * * * *